2,833,711

METHOD OF TREATING BRINE DISPOSAL WELLS AND COMPOSITION THEREFOR

Wilbur Ray Arnold, Chase, Kans., assignor, by mesne assignments, to Sinclair Oil & Gas Company, Tulsa, Okla., a corporation of Maine No Drawing. Application October 4, 1954
Serial No. 460,277

5 Claims. (Cl. 252—8.55)

This invention relates to the disposal of salt water produced in oil fields. In particular, the present invention concerns the treatment of brine disposal wells, or similar subterranean disposal formations employed as salt water disposal wells, to maintain the input rate, or in the case of a well or other formation having decreased input rates, to increase said rates.

Much of the crude oil produced from sub-surface formations is accompanied by salt brines originating in and adjacent to the oil-bearing strata. This brine is separated from the crude oil in the field and must be disposed of in an economical manner. To avoid contamination of surface water it has been a common practice to return this brine to the parent formation or to some other suitable formation above or below the parent one.

In some areas brine flows readily into the chosen disposal formation while in others pumps are necessary to overcome resistance encountered. Every effort is made to keep the brine free of oil and other contamination which may plug off exposed surfaces of the disposal formation, but in spite of this a gradual decline in input volumes or an increase in the pressure required to maintain injection rates is frequently encountered. Mechanical clean out, explosives, acid treatment and solvents have been used with varying degrees of success for cleaning the exposed surfaces of the input formation. The first three of these methods are generally effective but the equipment and labor costs involved and the loss of input time on the well while it is being serviced make these methods expensive. Solvents and water soluble wetting agents have, in general, proven ineffective or at best have given only temporary relief. Each subsequent treatment gives diminishing results until one of the expensive methods of clean-out is necessary.

The face of input formations normally is far below the ground; any explanation of the action of a successful treating agent would, therefore, be highly speculative as it could be neither observed nor the results of such treatment tested in any manner qualitatively satisfactory. Under these circumstances, the treatment of disposal wells is obviously a highly empirical art. This is clearly evidenced by the variety of physically and chemically unrelated methods previously employed as described above.

The present invention provides a method whereby high input rates in salt water disposal wells can be maintained, and, in instances of decreased input rates, high input rates can be reestablished. I have discovered that addition of oil-soluble sulfonates to an input well showing an input volume rate decrease will materially affect the well in a manner to increase the input volume rate. I have further discovered that the periodic addition of oil-soluble sulfonates to salt water disposal wells which are subject to decreased input rates will maintain the input rates at a level sufficiently high to permit further economic use of the disposal wells.

The above advantages are obtained in accordance with my invention by adding oil-soluble sulfonates, preferably oil-soluble petroleum sulfonates, to the disposal wells being treated. The invention can be practiced by periodic addition of small quantities of the sulfonates to wells which have shown tendencies toward decreased input rates and can also be practiced by treating wells having negligible input rates with larger quantities of treating agent until the input rate increases sufficiently to permit further use. The oil-soluble sulfonate addition agents can be employed along or in conjunction with solvents and other carrier-type substances. The mode of practicing the invention either using the sulfonate alone or in conjunction with suitable solvents will depend upon the particular problems involved in the brine disposal well being treated more fully explained below.

Oil-soluble sulfonates generally and particularly oil-soluble petroleum sulfonates, can be employed in the present invention. Satisfactory oil-soluble sulfonates are commercially produced in the conventional sulfuric acid treatment of petroleum oils designed to produce highly refined mineral oils, such as lubricating oils and white oils. One particularly satisfactory method of producing the sulfonates is as follows: A Mid-Continent neutral oil is treated with four successive dumps of oleum, a total of 120 pounds of the oleum being used for each barrel of oil. Following removal of the separable sludge after the last dump of oleum, the acid oil was blown with air to remove $SO_2$ and settled to remove substantially the last trace of sludge. Thereafter, the oil was mixed with 0.5 percent by weight of water and neutralized with an excess of anhydrous ammonia. Finally, the oil was heated to a temperature of 280° F. to dehydrate it, and filtered. In practicing the present invention, the sulfonates as a concentrate in the oil from which they are derived can be used as such. If desired, the sulfonates can be extracted with an alcohol, such as isopropanol, and then used as an alcohol solution, the alcohol can be added to the oil-sulfonate concentrate and the mixture used or the sulfonates can be recovered from the alcohol mixture, for example by distillation, and employed as such in the present invention. Obviously other solvents, such as neutral oils, light lubricating oils, white oils and the like can be employed as solvent for the sulfonates and used in the present invention. Alkali salts, such as sodium, potassium and lithium, and alkali earth metal salts, such as calcium, strontium, barium and magnesium, of the mahogany acids can also be employed in accordance with my invention; however, the ammonium mahogany sulfonates constitute the preferred form of mahogany sulfonates for this invention. During the sulfuric acid treatment of petroleum oils a sludge layer containing a large percentage of water soluble sulfonic acids forms after each addition of the acid. These so-called "green" acids can be recovered by well-known processes, such as treating the sludge with an emulsion breaker and recovering the released sulfonic acids, and can then be converted to oil-soluble sulfonates by known methods, for example, by neutralizing with a highly oil-soluble amine such as amino propyl tallow amine.

An example of producing oil-soluble sulfonates from water-soluble or "green" sulfonic acids is as follows: A sweet west Texas dewaxed distillate was contacted with sulfur trioxide as a gas consisting of 9 parts air and 10 parts $SO_3$. The oil (750 grams) was placed in a three-neck flask equipped with a stirrer and was agitated vigorously while the sulfur trioxide air mixture was bubbled through the oil. Addition of the gases was regulated so as to maintain a reaction temperature of 140° F. During a 30-minute reaction period 127.5 grams of $SO_3$ were passed into the flask. Thereafter stirring was discontinued and the reaction mixture separated into a supernatant oil layer amounting to 502 grams of oil containing mahogany sulfonic acids and a 350 gram bottom layer consisting of hydrocarbon-insoluble or sludge acids. The mahogany acids were separated by decantation and an amount of isopropyl alcohol equal to the volume of sludge acids was added to the flask containing the sludge acids to facilitate handling. Small increments of amino propyl tallow amine were added to the acid-alcohol solution until a pH of 7 to 8 was obtained. When the acids were neutralized, the green color of the solution turned to a deep brown, and this happened when one part of amine was added to two parts of acid. The alcohol solution of the amine sulfonate can be used as such in the present invention; if desired, the alcohol can be removed by distillation, and the sulfonates recovered can be used in the invention. Alternatively a hydrocarbon solvent can be added to the alcohol-sulfonate solution to facilitate handling and the mixture obtained employed in treating wells in accordance with the present invention. A solvent which has been used in practicing my invention is identified as No. 45 solvent—Corpus Christi (hereafter identified as No. 45 solvent) and has the following specifications:

| | |
|---|---|
| Gravity | 18.5–22.5. |
| Flash P. M. | Min. 190. |
| Vis. at 100° F | 30–35. |
| Pour | Max. –20. |
| Color | Dark. |
| Carbon residue | Max. 0.04. |
| Percent sulfur | Max. 0.15. |
| Aniline pt., ° C., (ASTM D 611 or D 1012) | 10.0–18.0. |
| Distillation ASTM D 158: | |
| Initial, ° F | Min. 400. |
| 50% recovered | 460–510. |
| 90% recovered | 510–545. |
| End point | Max. 620. |

Ammonium and alkali metal mahogany sulfonates are articles of commerce; sludge acids are also produced commercially as are their oil-soluble amine salts. The mahogany sulfonates as obtained commercially can be used in the present invention. As indicated above, mineral lubricating oils, aliphatic alcohols, neutral oils and the similar solvents can be added to the sulfonates to facilitate handling. The concentration of sulfonate in any such solvent can vary widely, though a 10 volume percent concentration has been used with highly satisfactory results and constitutes the preferred concentration. In general, if the concentration is less than 10 volume percent, a greater quantity of the solution would be required than when employing a concentration of 10 or more volume percent. Commercially produced oil-soluble sulfonates of sludge acids can also be used as such in this invention. When employing the sludge acids to produce sulfonates suitable for the present invention, as pointed out above, the sulfonates obtained must be oil-soluble. Generally, the sulfonates produced will be oil-soluble when they are neutralized with alkylamines having at least about 5 carbon atoms in the alkyl group and preferably from about 8 to 30 carbon atoms per molecule. In using oil soluble sulfonates produced from sludge acids as a solution in an alcohol or mineral lubricating oils and neutral oils, or in both alcohol and a solvent oil, the concentration can vary with a concentration of about 10 to 15 volume percent being preferred. As in the instance of mahogany sulfonates, a concentration of less than about 10 volume percent would require a greater quantity of solution than if a higher concentration were used.

As indicated above, the oil soluble sulfonates need not be employed alone to effect the present invention. In addition to or in lieu of the use of alcohols and mineral oil-soluble solvents for the sulfonates, carbon disulfide can be employed. Carbon disulfide, like alcohols and mineral oil solvents, has no appreciable effect on input rates of and by itself. Unlike alcohols and solvent oils, a carbon disulfide solution of the sulfonates (or a carbon disulfide solution of the alcohol-oil-sulfonate solution) appears to produce a synergistic effect in the well which is greater than the cumulative effect of carbon disulfide and the sulfonates by themselves. Generally, I prefer to employ carbon disulfide when a well is substantially completely plugged and contains brine standing in the well bore. When employed, the carbon disulfide is normally added either with the sulfonate or after the sulfonate, the sulfonate goes into solution and the carbon disulfide effectively transports the sulfonate through the well and any brine therein to the face of the formation being treated. The quantity of carbon disulfide employed to obtain its greatest effect ordinarily is substantially equal to the volume of solution it solubilizes or transports to the disposal formation; in general, I prefer to use about 1:1 volume ratio of $CS_2$ to sulfonate solution having 10 volume percent of sulfonates and a range of 0.5 to 3:1 will generally be satisfactory. On the basis of pure sulfonates the carbon disulfide is used in amounts of about 5 to 30 volumes per volume of sulfonate used.

An example of the treatment effected in accordance with the present invention is as follows: A salt water disposal well in the Volkland system, identified as F. B. Wallace Lease Well No. 2, after continued use eventually was plugged off to the point where the injection rate was less than 1 barrel of brine per hour. About 10 gallons of an ammonium mahogany sulfonate-oil concentrate (the oil-sulfonate concentrate produced in acid treating lube oils and containing about 48 volume percent of a neutral oil having a viscosity of 100 SUS at 100° F. and 43 volume percent of No. 45 solvent) were added to the well at the well head. Within a few hours improved injection rates were observed and after repeated treatment using a total of about 50 gallons of the treating agent the input rate had increased to about 1500 to 2000 barrels of brine per day. The sulfonates were present in the treating agent to the extent of about 10 volume percent.

A second example of the use of the present invention and of its effect is as follows: A brine disposal well in the Fairfax area, Osage County, Oklahoma was expected to take care of 500 barrels of brine per day, using a centrifugal injection pump located about 1500 feet from the injection well and using a pump pressure of about 220 to 250 p. s. i. g. During normal use of this well the input rate gradually decreased to the extent that brine normally produced from the oil-producing wells in the area had to be stored and in due course, several oil wells, especially those producing the highest percentage of brine, had to be shut down due to lack of brine tankage. At this time the brine input rate was about 200 barrels per day. About 25 gallons of the ammonium mahogany sulfonates of the preceding example were introduced into the suction side of an injection pump in 30 minutes' time. The action of pump effectively dispersed the sulfonate in the brine. Regular treatment using one gallon of the sulfonate solution in each 12 hours was instituted. With one week, the accumulated brine plus all of the brine produced when all of the wells were in action was effectively disposed of in the disposal well. It became necessary to shut down the injection pumps several hours a day due to the lack of brine; while there was insufficient brine to determine the exact input rate of which this well was capable, the potential injection obviously was well above 500 barrels per day.

A third example of my invention is as follows: A salt water disposal well in Rice County, Kansas, had a history of requiring acid treatment once each year. Upon complete plugging the well was treated with 55 gallons of a solution containing 14 volume percent of water soluble sulfonic acid (sludge acids), 9 volume percent of amino propyl tallow amine, 16 volume percent of isopropanol and 61 volume percent of No. 45 solvent; this solution was made at room temperature thus effecting reaction between the acids and amines to convert the acids to oil-soluble sulfonates. Immediately following the addition of the sulfonate solution, 55 gallons of carbon disulfide were added. The input rate was then measured and found to be about 850 barrels per day.

A treatment of a second disposal well, in Rice County, with a solution of oil-insoluble sludge sulfonates was found to produce no appreciable effect on the input rate. The solution contained 12 percent ammonium sludge sulfonates, 45 percent carbon tetrachloride, 40 percent No. 45 solvent and 3 percent unsulfonated lube stock and isopropanol (all volume percent). These oil-insoluble sulfonates were produced by the same process and from the same stock as those employed to produce the oil-soluble sulfonates mentioned in the preceding paragraph. This experiment demonstrates the necessity of employing oil-soluble sulfonates in my invention.

The above examples demonstrate actual tests of the present invention in commercial scale operations. While definite quantities of treating agent have been set forth in the examples it is to be understood that the invention is not to be so limited. The quantity of agent to be used in any case either initially or incrementally as a regular practice where it is known that the wells are subject to decreased input rates can only be determined by experience with the well. For example, it is obviously uneconomical to continue the treatment of an input well past the point where the well is accepting all of the brine available for injection. Thus, in some cases one treatment will be sufficient; in other cases periodic treatments or regular treatments scheduled for definite times each day, each week, or each month will be the most desirable procedure to follow. Generally, however, I have found that quantities ranging from about 10 to 100 gallons of sulfonate solutions containing about 10 volume percent of sulfonates are satisfactory for initial treatment and about 1 to 5 gallons of the solutions are satisfactory where periodic addition is to be practiced. On the basis of pure sulfonates, about 1 to 10 gallons are used for initial treatment and about 0.1 to 0.5 gallon where periodic addition is to be practiced. As a practical consideration, I find it desirable to follow each addition of sulfonate solution with the addition of an equal volume of carbon disulfide to insure rapid transport of the sulfonate to the disposal formation. Similarly, it is usually desirable to introduce the sulfonate to the well by means of a pump thereby insuring dispersion of the sulfonate in any brine which stands in the well.

I claim:

1. A composition of matter useful in treating brine disposal wells having a tendency towards decreased input rates consisting essentially of substantially equal volumes of carbon disulfide and an oil solution of oil-soluble sulfonates, the amount of said oil-soluble sulfonate being sufficient to substantially increase the brine input rate.

2. A composition of matter useful in treating brine disposal wells having a tendency towards decreased input rates consisting essentially of carbon disulfide containing oil soluble sulfonates in an amount effective to improve the input rate of a brine disposal well.

3. The method of treating brine disposal wells having a tendency towards decreased input rates which consists essentially of adding an oil-soluble sulfonate to a brine disposal well in an amount effective to increase the input rate of said well.

4. The method of claim 3 wherein carbon disulfide is added to the well in an amount sufficient to increase the effect of the oil soluble sulfonates.

5. The method of claim 4 wherein 5 to 30 volumes of carbon disulfide are employed for each volume of sulfonate used.

References Cited in the file of this patent

UNITED STATES PATENTS

| | | |
|---|---|---|
| 1,844,883 | De Groote | Feb. 9, 1932 |
| 2,050,931 | De Groote | Aug. 11, 1936 |
| 2,135,589 | Monson | Nov. 8, 1938 |
| 2,267,548 | Berl | Dec. 23, 1941 |
| 2,356,205 | Blair et al. | Aug. 22, 1944 |
| 2,356,254 | Lehmann et al. | Aug. 22, 1944 |
| 2,358,665 | Shapiro | Sept. 19, 1944 |